United States Patent
Thompson (10) Patent No.: US 6,490,154 B2
(45) Date of Patent: Dec. 3, 2002

(54) DESKTOP PORTABLE COMPUTER VERTICAL DOCK SYSTEM

(76) Inventor: Eric Thompson, 14206 SE. 165th Pl., Renton, WA (US) 98058

( * ) Notice: Subject to any disclaimer, the term of this patent is extended or adjusted under 35 U.S.C. 154(b) by 0 days.

(21) Appl. No.: 09/730,141

(22) Filed: Dec. 4, 2000

(65) Prior Publication Data

US 2001/0000447 A1 Apr. 26, 2001

Related U.S. Application Data (60) Provisional application No. 60/088,477, filed on Jun. 4, 1998.

(51) Int. Cl.$^7$ ................................................. G06F 1/16
(52) U.S. Cl. ....................................... 361/686; 361/683
(58) Field of Search ................................ 361/679–686

(56) References Cited

U.S. PATENT DOCUMENTS

| | | |
|---|---|---|
| 5,436,792 A | 7/1995 | Leman |
| 5,537,290 A | 7/1996 | Brown et al. |
| 5,729,429 A | 3/1998 | Margaritis et al. |
| 5,751,548 A | 5/1998 | Hall et al. |

*Primary Examiner*—Darren Schuberg
*Assistant Examiner*—Yean Hsi Chang
(74) *Attorney, Agent, or Firm*—J. Michael Neary (57) ABSTRACT

A mobile computer docking mechanism which transforms a laptop computer into a fully capable desktop computing and telephony system. The invention facilitates the use of the laptop liquid crystal display screen while the laptop computer is in the docked position. The network, keyboard and power ports are connected in the docked position, and the entire desktop configuration has a very low profile taking up very little desktop space. The upright position and design facilitates proper docking and an adjustable ergonomic viewing position, elevation as well as angularity. A combination of two laptops can provide the ability to view and operate simultaneously.

20 Claims, 14 Drawing Sheets

DESKTOP PORTABLE COMPUTER VERTICAL DOCK SYSTEM

This is related to U.S. Provisional Application No. 60/088,477 filed on Jun. 4, 1998 and PCT Application No. PCT/US99/12536 filed on Jun. 4, 1999.

This invention relates to a desktop laptop docking system facilitating the use of the laptop liquid crystal display (LCD) as the primary display system. This innovation transforms a laptop computer into a full-function desktop computing system in seconds. With this invention, users may insert their laptop and view the laptop screen at eye level as they would a traditional LCD connected to a desktop PC system. However, the laptop is in fact docked to the network, keyboard, and any other appropriate interfaces through the insertion into this support mechanism. Network telephony features are also supported through the system when it is loaded and ready.

BACKGROUND OF THE INVENTION

Portable computing docking systems are readily available in many forms. Some have even included a laptop support system. Some have even included a structural laptop support system. Commercially available laptop models insert or 'snap' into the data docking devices horizontally. The power connection is independent on some models. However, none have attempted to dock the portable computer in such a way that the docked portable computer actually uses its portable screen in an upright, ergonomically correct viewing position as one would position a traditional CRT monitor screen. This position would offer an ergonomic view of the screen and save the cost of purchasing an additional monitor for desktop viewing. Laptop screens are now being offered with viewing areas equivalent to a desktop 17" CRT monitor. Therefore, this invention enables a dual use of the laptop LCD, namely, desktop and portable viewing. Stand alone LCD monitors as replacements for traditional CRT monitors are gaining popularity as they use much less desktop space than traditional monitors. However, they are still costly in comparison to traditional monitors. Therefore, the user of this invention can forego the purchase of an additional costly display system as one is already resident in the laptop computer. Furthermore, the system supports full telephony connectivity as well as the normal computing functions.

SUMMARY OF THE INVENTION

Accordingly, it is the object of this invention to provide a mobile computer peripheral that transforms the portable to a fully functional desktop computer system. In order to properly use the laptop display as the primary office LCD display system, a mechanism is needed to accomplish three things: 1) secure the laptop LCD display in an appropriate position relative to both the desktop surface and the user viewing the screen offering proper system ergonomics as well as adjustment capability; 2) provide a corresponding method for the laptop power, network and docking ports to be connected quickly and easily after the laptop is properly mounted; and 3) offer speakers, a power system, telephony connections, and a keyboard and mouse connection for the laptop.

This invention comprises a desktop computing platform built from a portable computer, such as a laptop computer or a PC tablet computer, and a unique docking station mechanism, hereafter referred to as a dropdock. The invention has an internal frame with an adjustable slot mount into which the base of the laptop computer is inserted. The adjustable slot mount is designed to hold the laptop at an ergonomically appropriate position while at the same time permitting access to the laptop functions such as the floppy drive, the PC cards and the CD ROM drive. Openings are provided so the system can be accessed appropriately. Furthermore, the invention enables connections to network ports, keyboard connections and power ports via the several docking port connection options. These include ports on the uprights holding the LCD on the laptop. A docking bar connection is held in place by a support on the top of the dropdock. The docking bar snaps down onto the laptop ports.

Another option is a PC card dock, a docking port cable that is connected after the laptop is inserted into the system.

A universal serial bus (USB V 2) docking option is a third method to dock the portable.

Finally, ports built into the front of the laptop provide a fourth option.

An optional anti-reflective screen can be included in front of the LCD depending on the lighting conditions under which the system is used. An integrated removable keyboard and mouse are held in the bottom front of the system. These are hidden when in the stored position with all extraneous cables locked away. They may also be connected without wires. Infrared or radio frequency wireless connections are already state of the art, complying with the 'Bluetooth' standard.

The base of the dock holds the power supply for the laptop as well as the network connection for the system.

BRIEF DESCRIPTION OF THE DRAWINGS

FIGS. 12 through 14 illustrate perspective views of combinations of two laptops for the ability to view two portable workstations simultaneously.

DETAILED DESCRIPTION OF THE PREFERRED EMBODIMENTS

In FIGS. 1–10, a conventional off-the-shelf laptop computer 1 is shown inserted into a supporting pocket frame 19. This existing computer has the following parts which are used in this application: a display screen such as a liquid crystal display (LCD) screen 2 that can be opened 180 degrees, PC card slots 5, floppy disk slots 6, a power cable connection 7, a USB port 8, a parallel port 9, a serial port 10, a docking port 11, an infrared port 12, and a CD-ROM drive 13. Some of these items are identified in FIGS. 1 and 2; the remaining ports are identified on FIG. 3.

The laptop keyboard 3 and the laptop touchpad 4 are not actively used in this configuration. The integrated removable external keyboard 16 and mouse 15 are held in the bottom front of the system.

The embodiments shown in FIGS. 1–4 are built upon a primary frame 20 mounted on the docking mechanism. It includes the supporting pocket frame 19 which holds the bottom half of the laptop computer 1. The laptop computer 1 is extended in such a manner that the LCD screen half 2 is located directly above the base, so the laptop stands in a straight plane, and the laptop base 1 is inserted into the supporting pocket frame 19, and one of four docking options, described later on, is used. When the base of the laptop computer 1 meets the bottom of the frame 19, the ports are engaged. Two speakers 18 are attached to either side of the support frame 19. A different type of portable computer, such as a tablet computer, may be used instead of the laptop computer. A tablet computer is like a laptop, but has only a large LCD display and no keyboard; the user uses a stylus to input data., An anti-reflecting filter 21, made of non reflective glass or plastic, is supported on a pivoting bracket 22 to fold over the LCD screen. The filter serves four purposes: 1) It makes the screen easier to read. 2) It gives the closed docking station a clean industrial design. 3) It reduces emissions of electromagnetic radiation from the laptop in settings such as hospitals etc. 4) It helps lock the laptop into the station to prevent theft. It can also provide privacy by restricting the viewing angle to prevent unauthorized viewing from the sides. There are numerous commercial filters available for such purposes from several sources, such as 3M.

Figure 5:
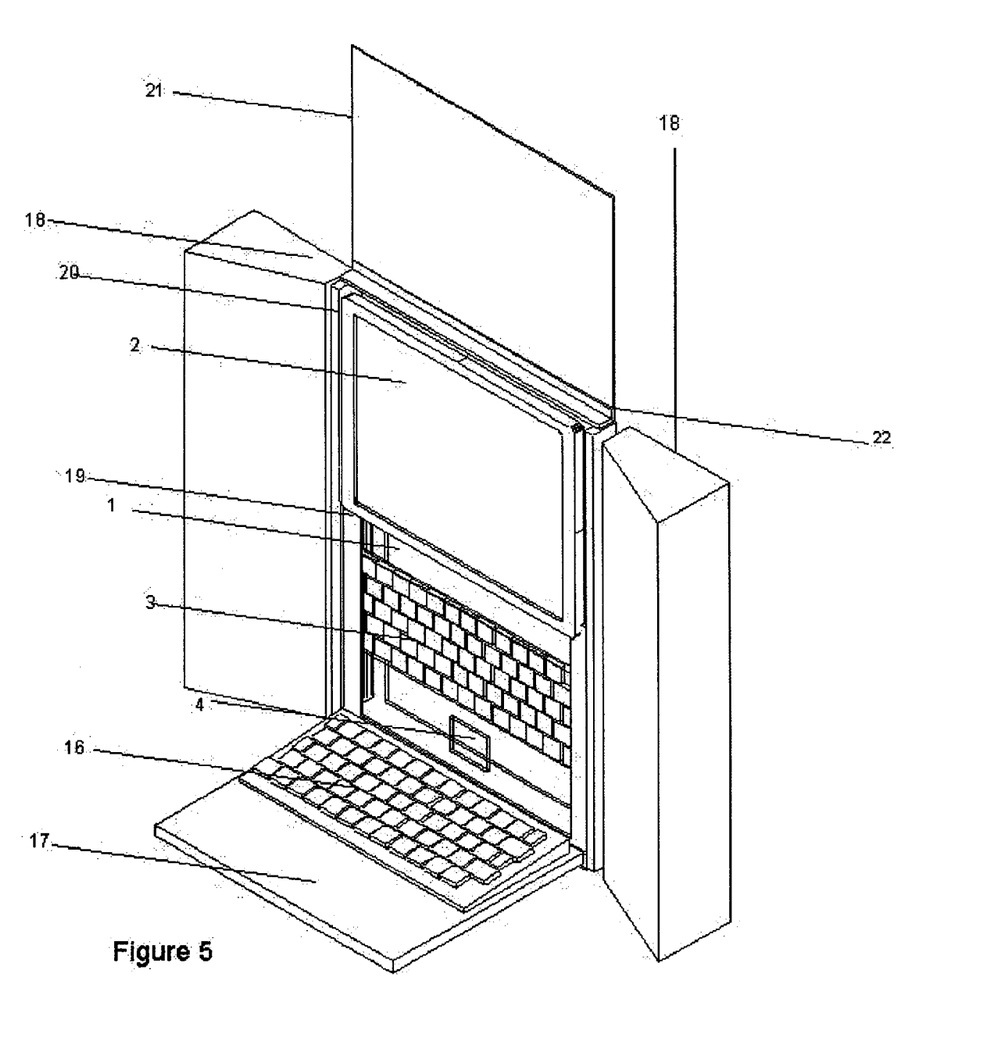
FIG. 5 is a perspective view from the front of an alternative configuration of a docking system in accordance with this invention having a tiltable pocket frame, showing the laptop in a lower, more ergonomic elevation.
Figure 6:
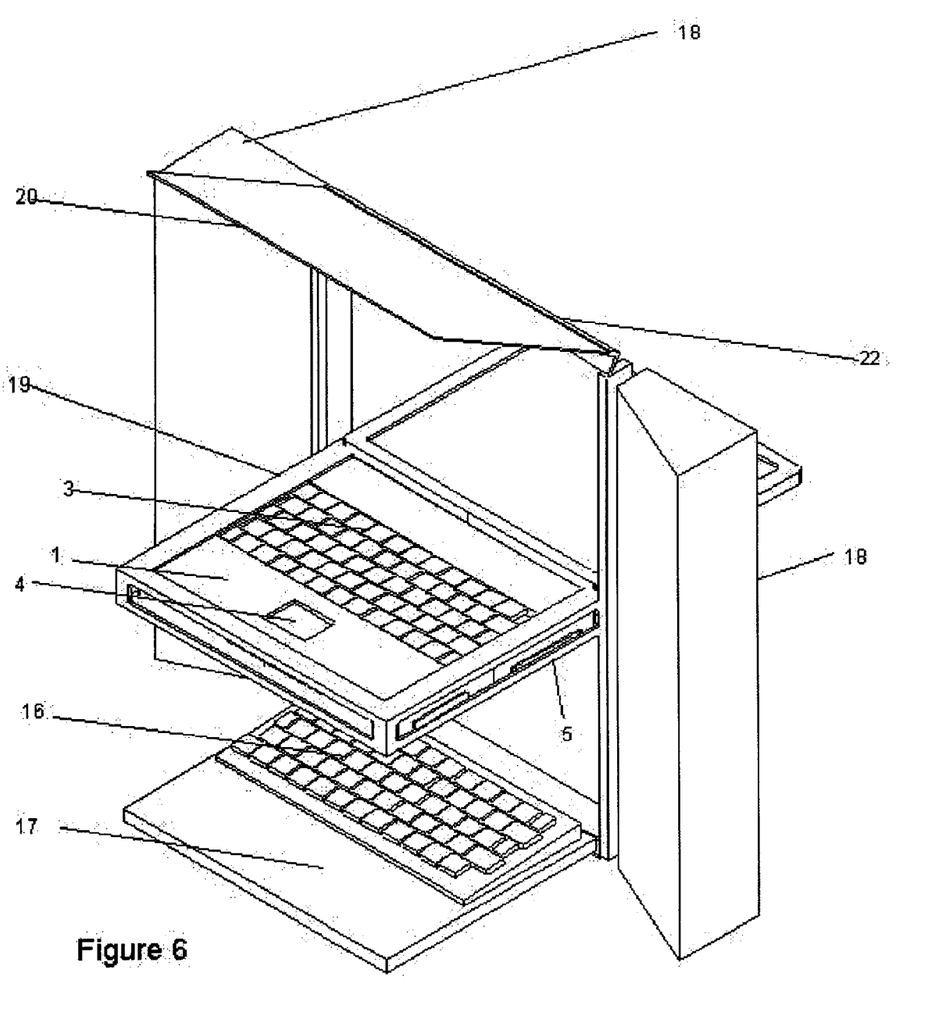
FIG. 6 is a perspective view of the docking station shown in FIG. 5, showing the tilted position of the pocket frame providing access to the CD-ROM and to the floppy disk slot and exposing both sides of the laptop for other connections.

The embodiment shown in FIGS. 5 and 6 supports the laptop in a lower, more ergonomic elevation. The pocket frame 19 is tiltable, as shown in FIG. 6, supported by the primary frame 20. The tilt provides an alternative method of access to the CDROM and to the floppy disk slot. At the same time, during rotation, both sides of the laptop are exposed for the other connections, i.e. PC Card, power cable, floppy, etc.

Figure 7:
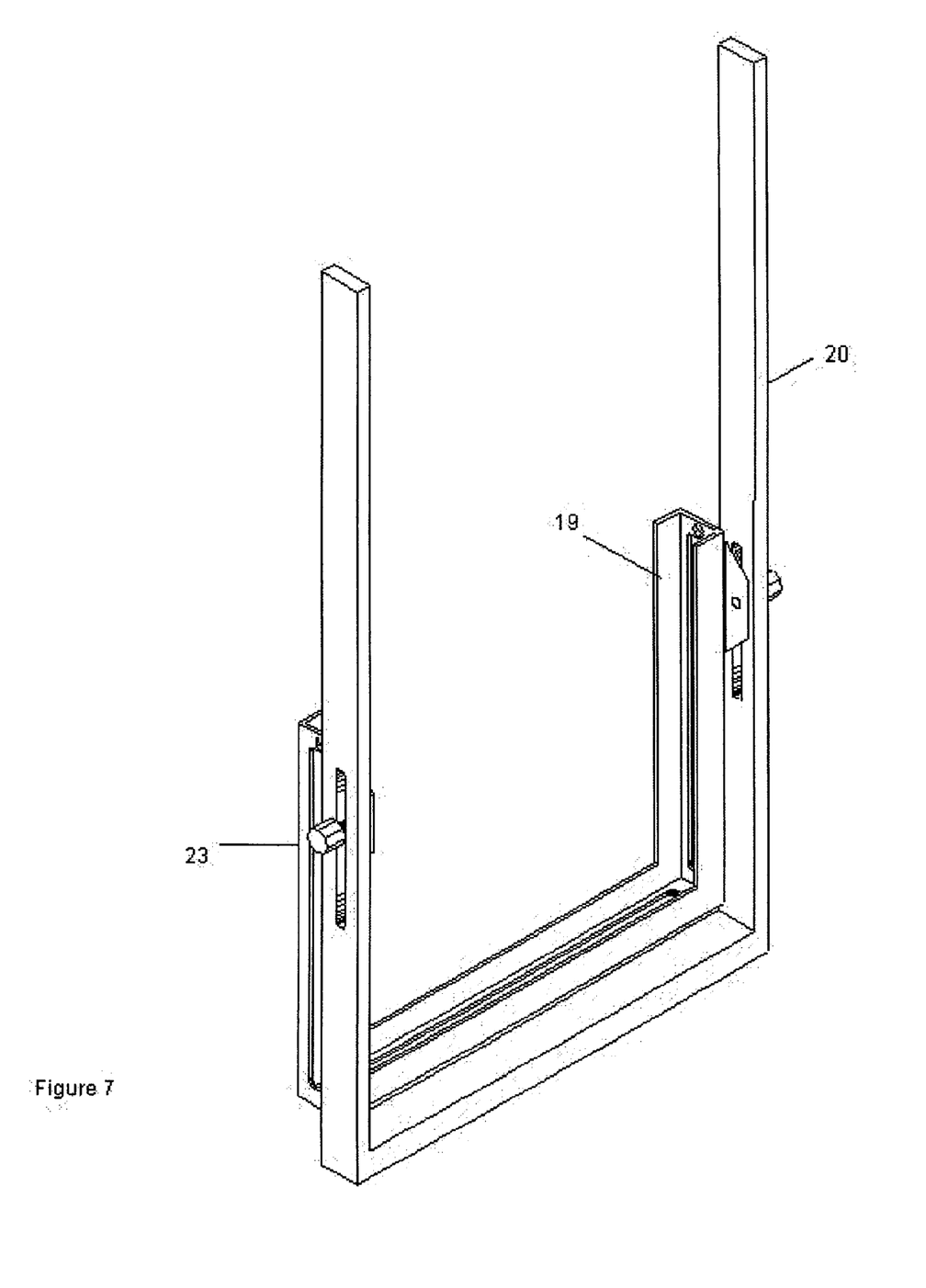
FIG. 7 is a perspective view from the rear of the embodiment shown in FIG. 6, illustrating the connection between the pocket frame and the main frame for longitudinal and rotational adjustment.

FIG. 7 illustrates from the rear the connection between the pocket frame 19 and the main frame 20 by means of an integrated pin and a thumb screw 23 on each side. This allows for longitudinal adjustment within the slots of the main frame 20 for vertical movement as well as for rotational adjustment. The pivotal connection of the pocket frame 19 to the main frame 20 or base could also be at the base of the pocket frame.

Figure 8:
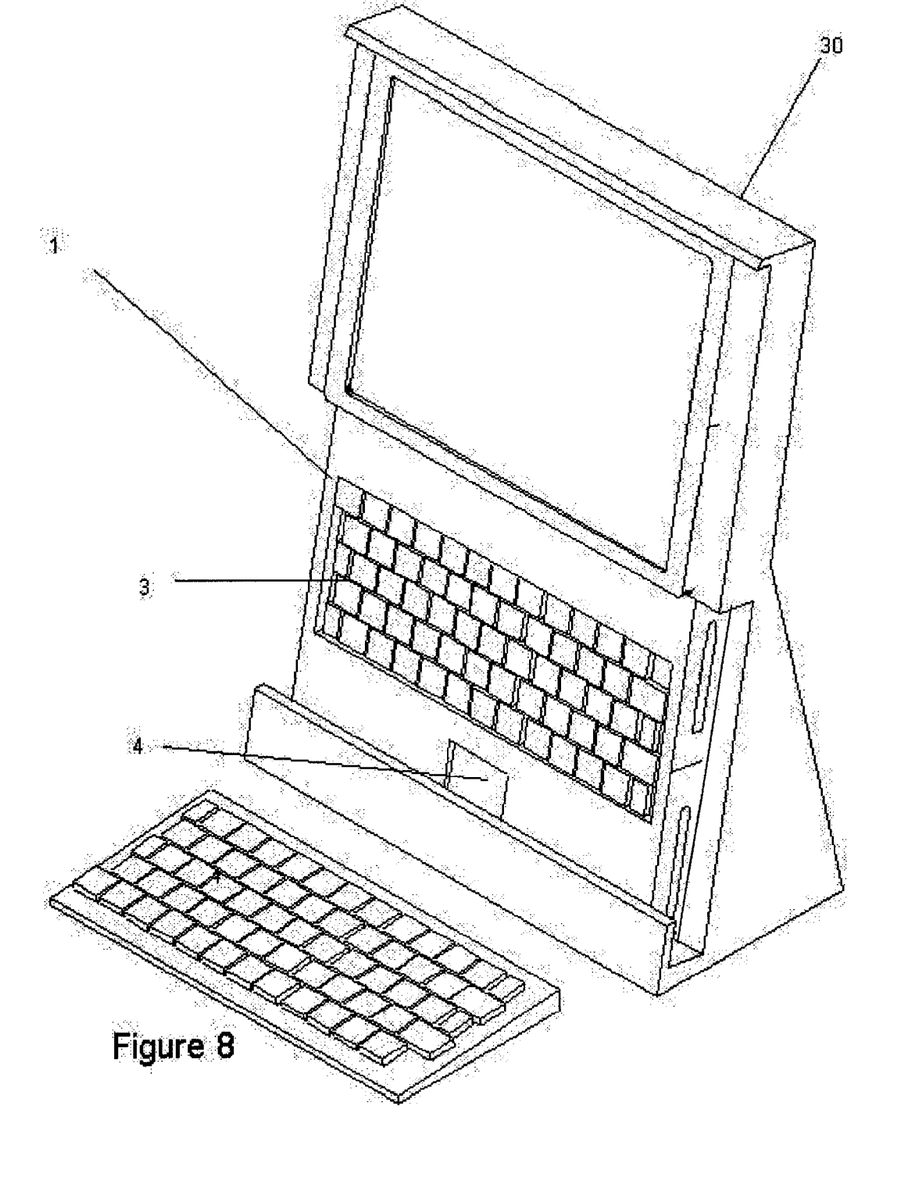
FIG. 8 is a perspective view of yet a different rendering of the invention, showing a monocoque type of a docking frame supporting an inclined unfolded laptop computer, with the lower part of the laptop slid behind a lip and the laptop leaning against the frame, with the sides of the laptop open for any connections.
Figure 9:
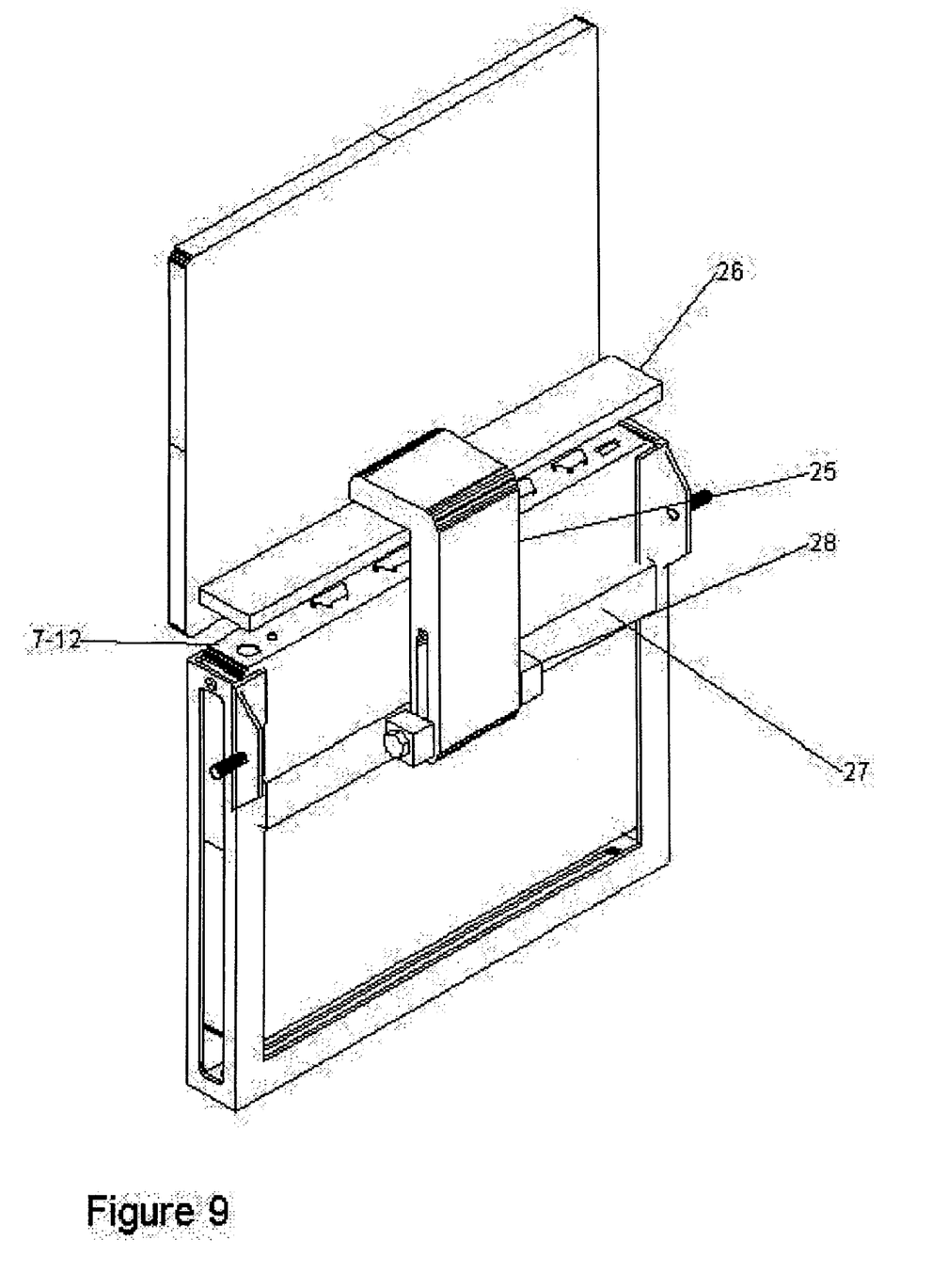
FIGS. 9 and 10 are perspective views of a port docking for standard laptops, from the upper rear and the lower rear, respectively.
Figure 10:
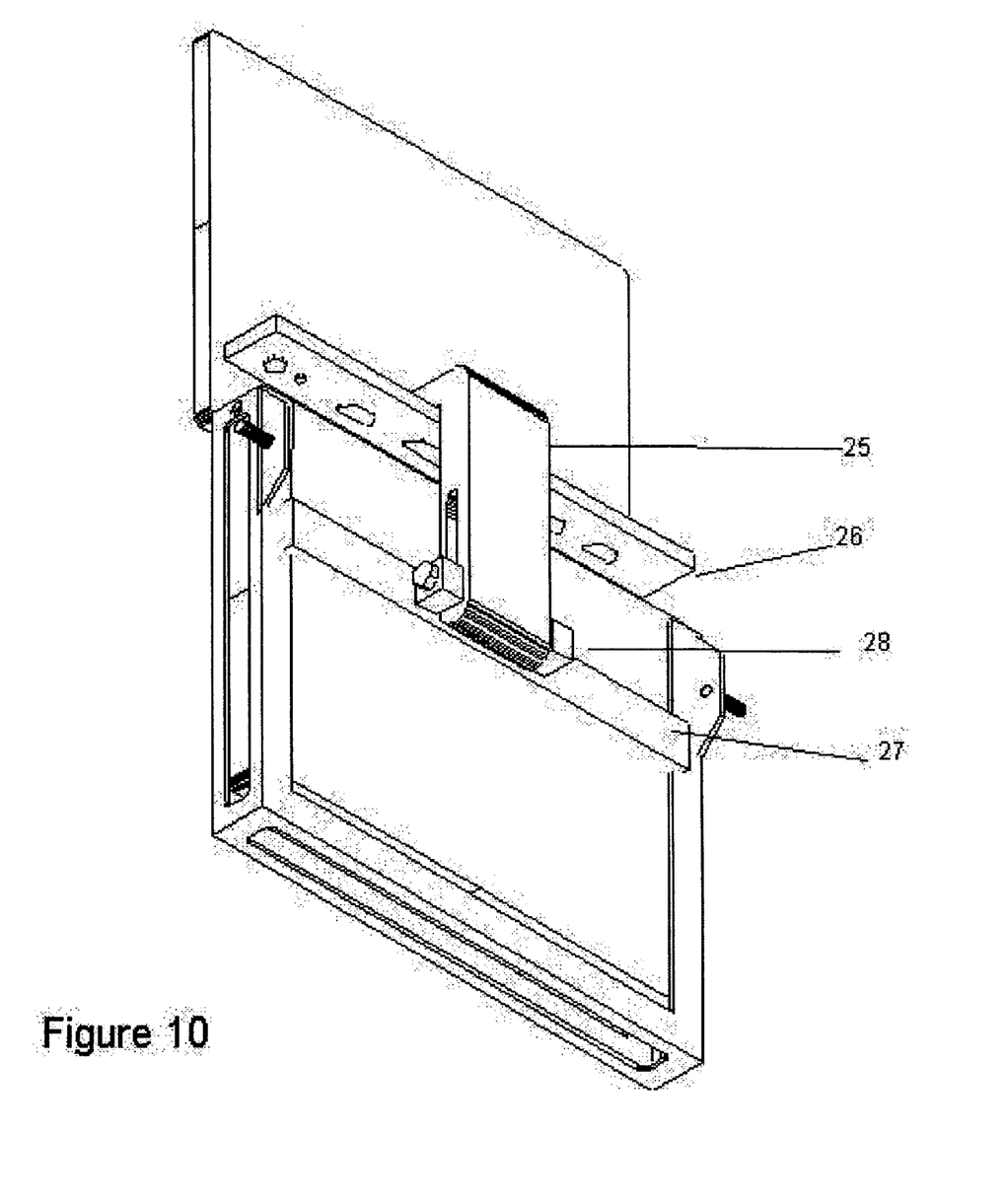

FIG. 8 depicts yet a different embodiment of a preferred concept. A monocoque type of a docking frame supports an inclined unfolded laptop computer. The lower part of the laptop slides behind a lip, the laptop leans against the frame, and the sides of the laptop remain open for any connections. Four Docking Options are Available:

1) Standard Docking, FIGS. 9 and 10

This option is used on off-the-shelf docking solutions. Commercially available data docking bars insert or 'snap' the laptop horizontally, the power connection is independent. The computer has provisions for this type of docking. However, adjustments need to be made for the vertical position. Therefore, the vertical docking bracket 26 is an innovation and a new part. This docking bar is held by a support 25, which is mounted to the pocket frame 19 via a cross-bar 27 and a bolt 28. The bar is snapped onto the laptop after it is placed into the system. In this way, loading the laptop involves two connections—one for the data connections including network serial and parallel via the docking port and another for the power connector, depending on the design of the existing laptop.

2) PC (Personal Computer) Card Dock (not shown)

A PC Card (formerly called PCMCIA Card) solution is available that can be added to this invention to facilitate an easy connection to the parallel, serial, keyboard, and mouse ports via a single card connection.

3) USB (Universal Serial Bus) (not shown)

This docking option, under standards review, allows connection to the network, keyboard mouse, parallel and serial parts via a single USB cable connected to the laptop.

Figure 11:
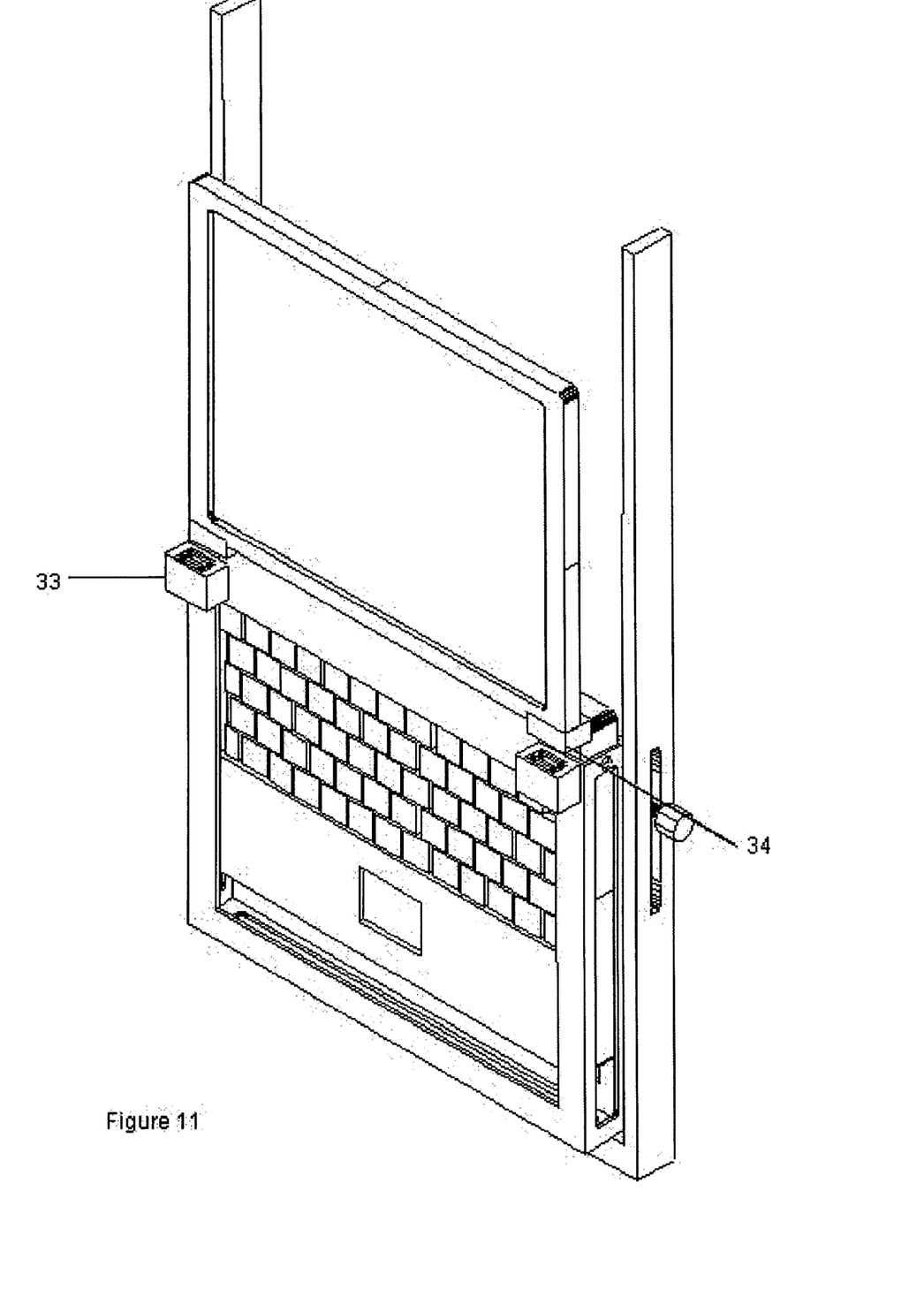
FIG. 11 shows a perspective view of another derivative when deploying a custom built laptop having a docking port at the upper front face of this laptop and the corresponding connecting ports at the base of the dropdock.

4) Port Docking via LCD Support Member, FIG. 11.

Another derivative when deploying custom built laptops involves placing the docking ports at the upper front face of the laptop and the corresponding connecting ports at the base of the dropdock. The LCD support members—two uprights that connect the LCD to the laptop base, have a docking power port 7 and data ports 8–12 that automatically engage as the laptop meets the dock.

System LCD Height Adjustment Innovation

The invention facilitates the adjustment of the laptop LCD elevation and angle to support the user viewing requirement for proper ergonomic viewing of the laptop LCD.

System Keyboard and Mouse Storage Innovation

Figure 1:
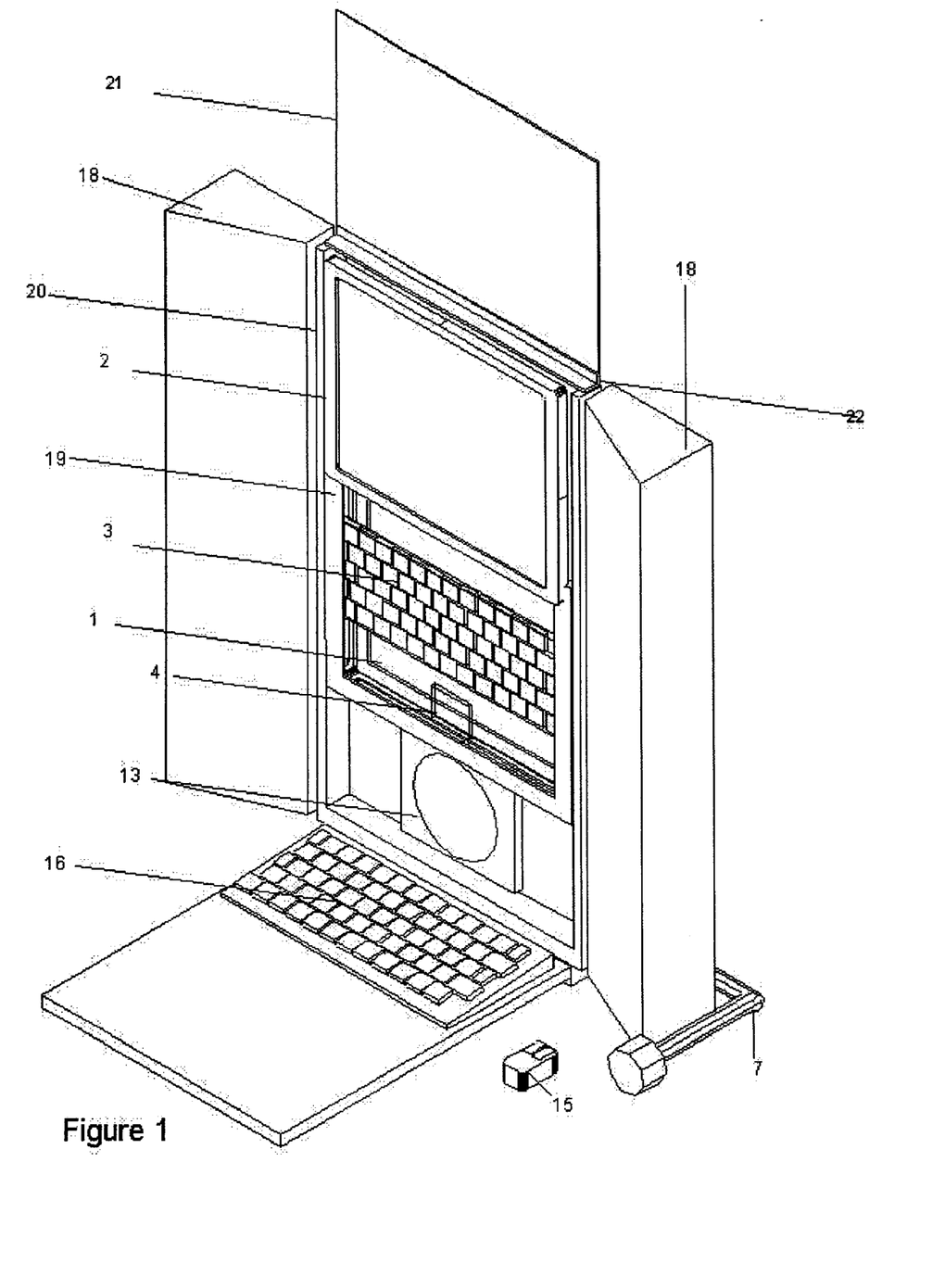
FIG. 1 is a perspective view from the front of the docking system with an external keyboard in the down position, which also allows access to the portable CD-ROM drive, which is shown in the open position.
Figure 2:
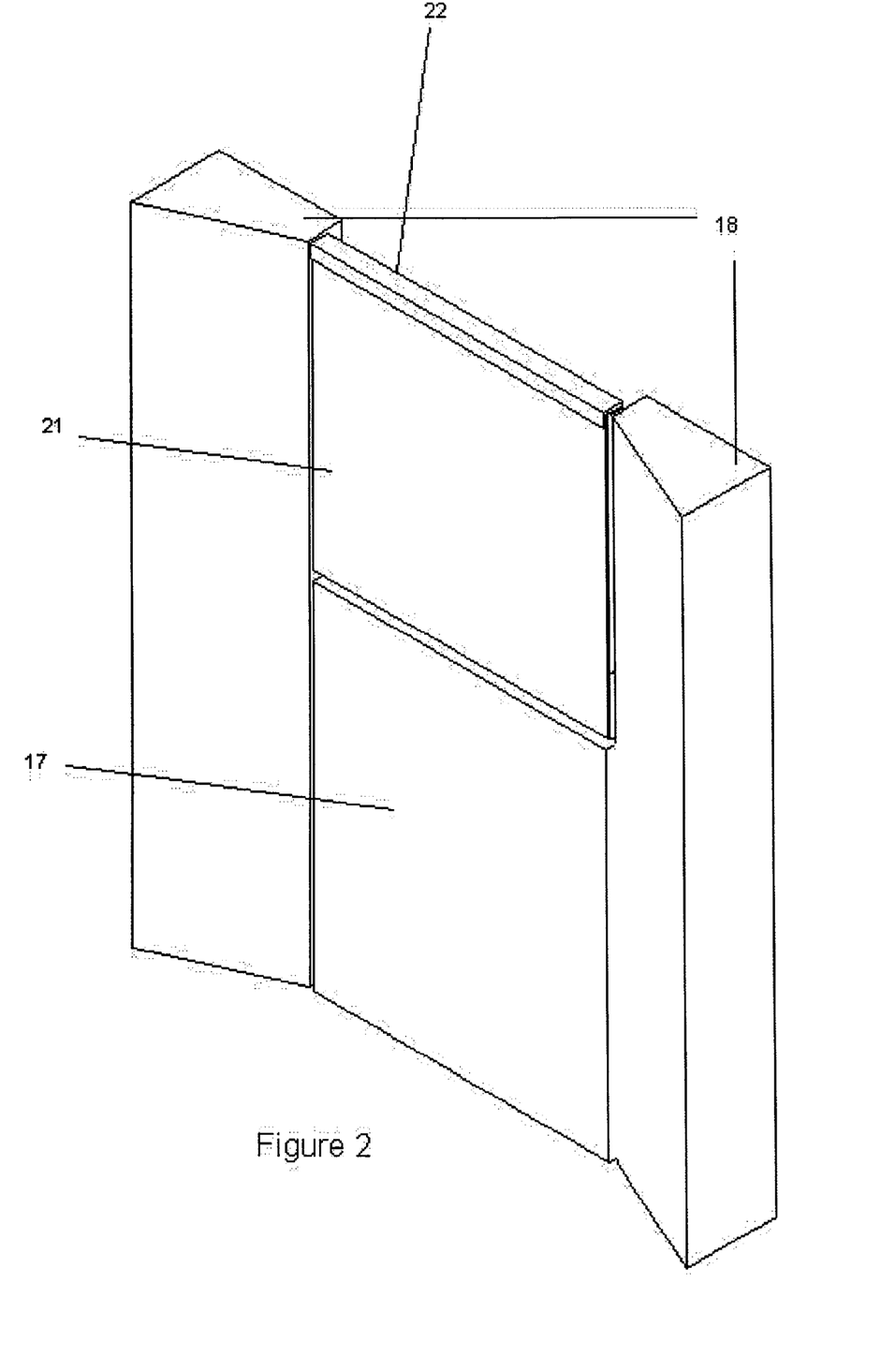
FIG. 2 is an equivalent perspective view from the front of the complete docking shown in FIG. 1, showing the closed position.
Figure 3:
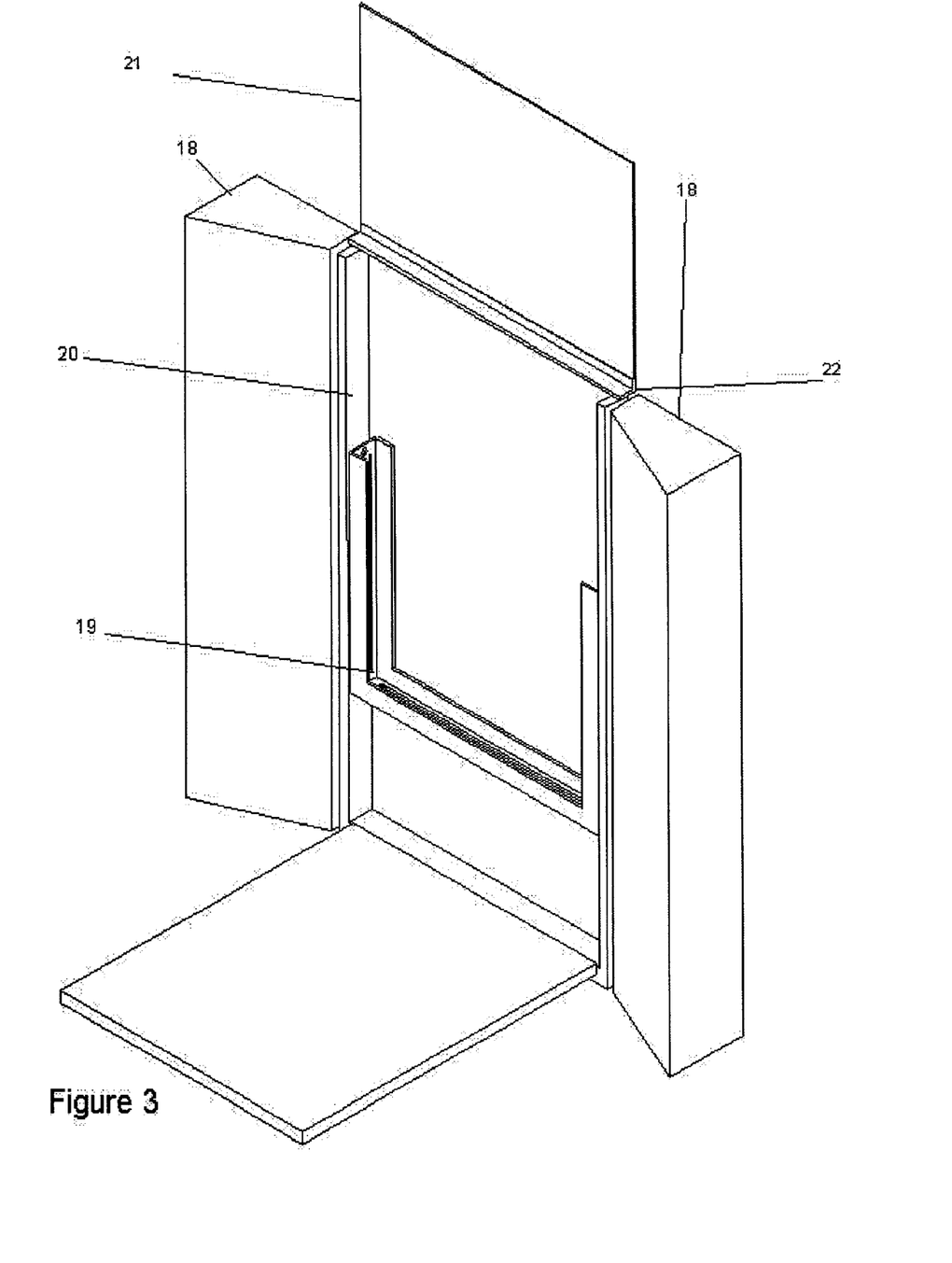
FIG. 3 is a perspective view of the docking system shown in FIG. 1, without the laptop computer.
Figure 4:
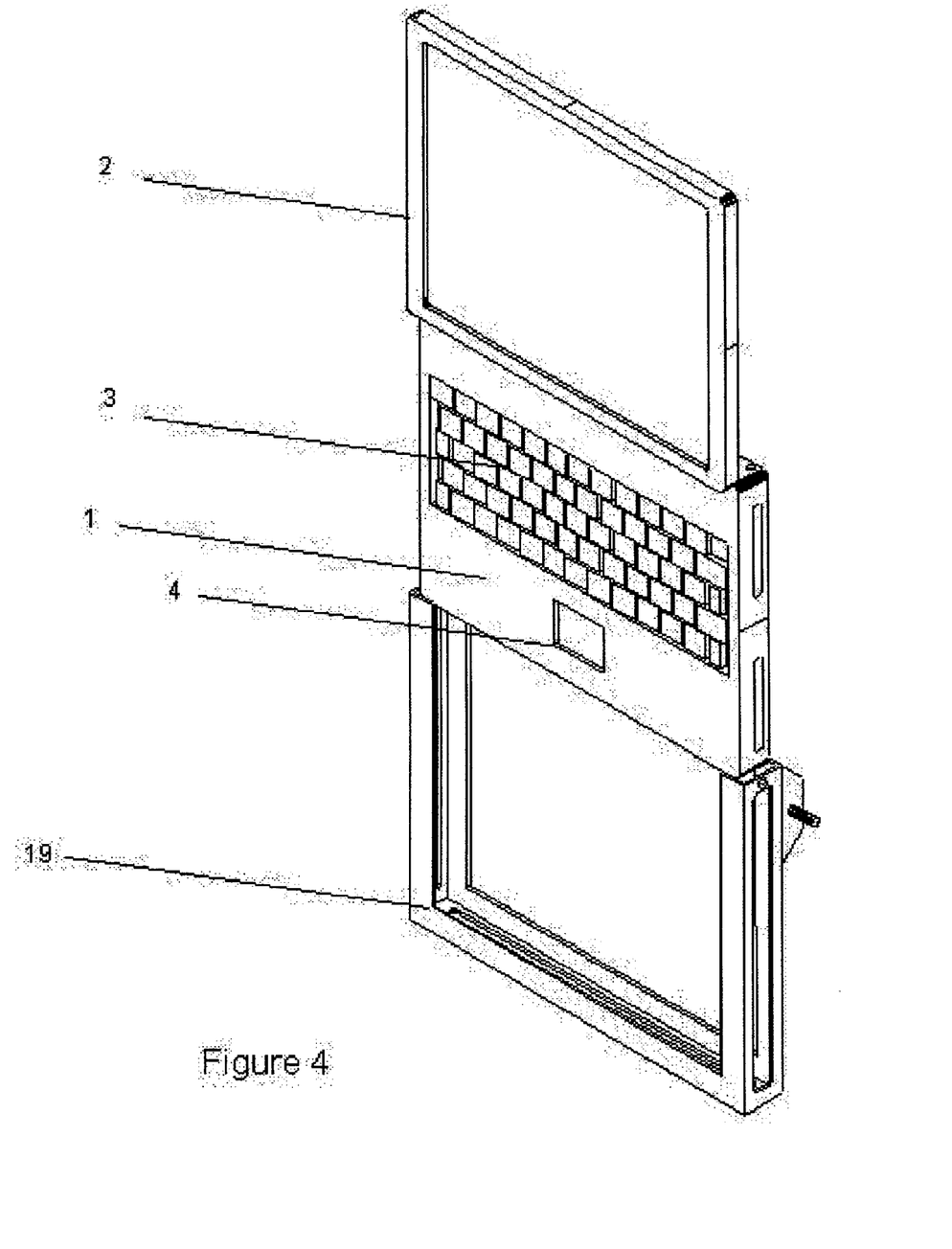
FIG. 4 is a perspective view of the internal pocket frame of the docking system shown in FIG. 1 showing the laptop is being loaded and showing openings that allow user access to PC card ports and the floppy disk port.

The system offers a secondary mouse 26 and keyboard 16 separate from that of the portable computer 1, as shown in FIGS. 1–3. The lower front section of the docking mechanism supports the keyboard 16 and mouse 26 in such a way that when they are placed in the stored position they integrate fully with the front of the system and are not visible, i.e. all cables are housed inside clearly out of view. At the same time they can be easily placed into the usable position when needed. These are hidden when in the stored position with all extraneous cables locked away.

The illustrations show the mouse 15 only. The power cable 7 was shown on FIG. 1. The other cable runs are not the subject of this invention, they would only complicate this disclosure and are omitted for clarity of illustration. Cables will likely become obsolete after new models complying with the 'Bluetooth' wireless standard are on the market.

Figure 12:
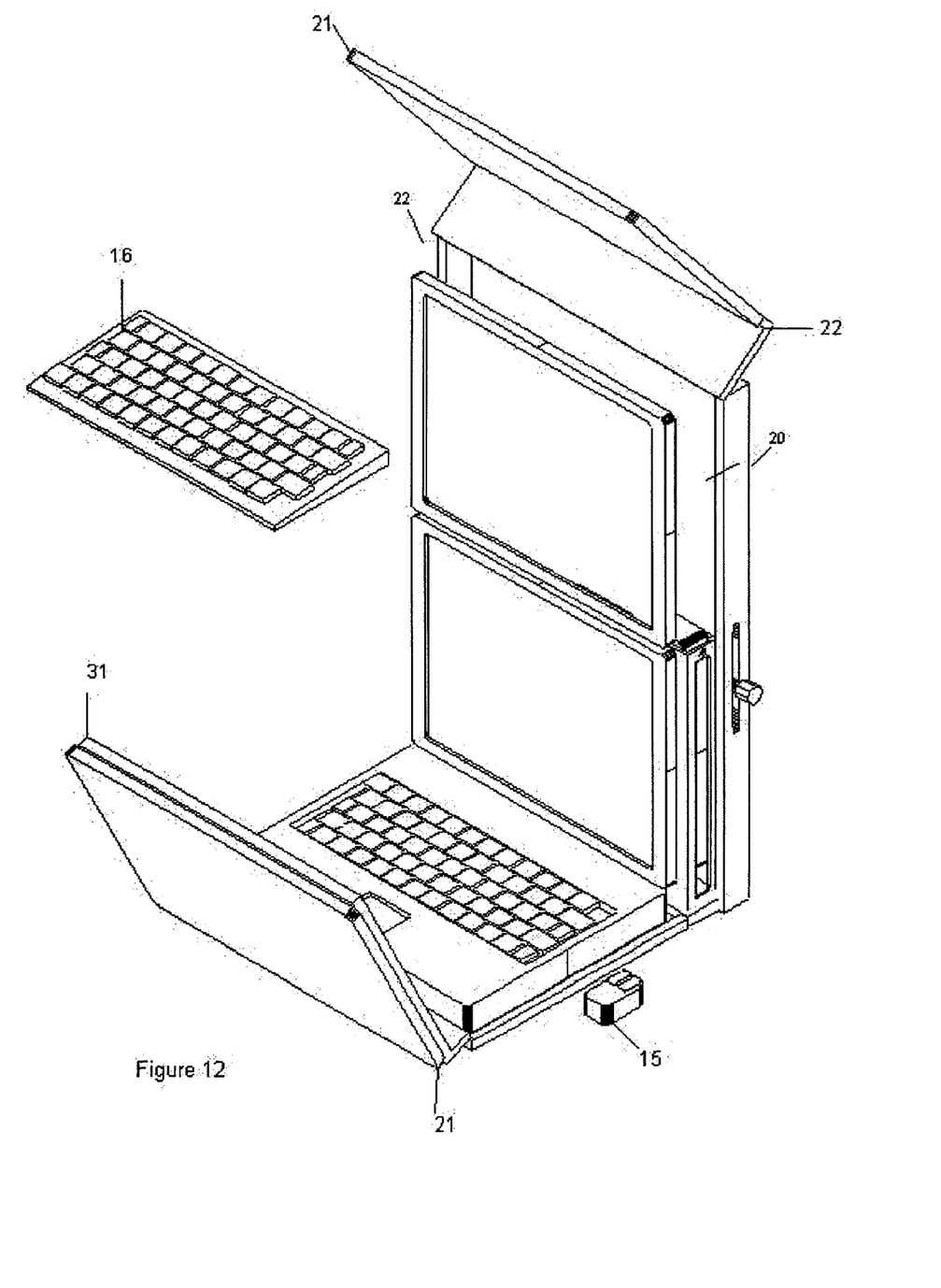
FIG. 12 shows a vertical arrangement, open, FIG. 13 the same arrangement in closed position.
Figure 13:
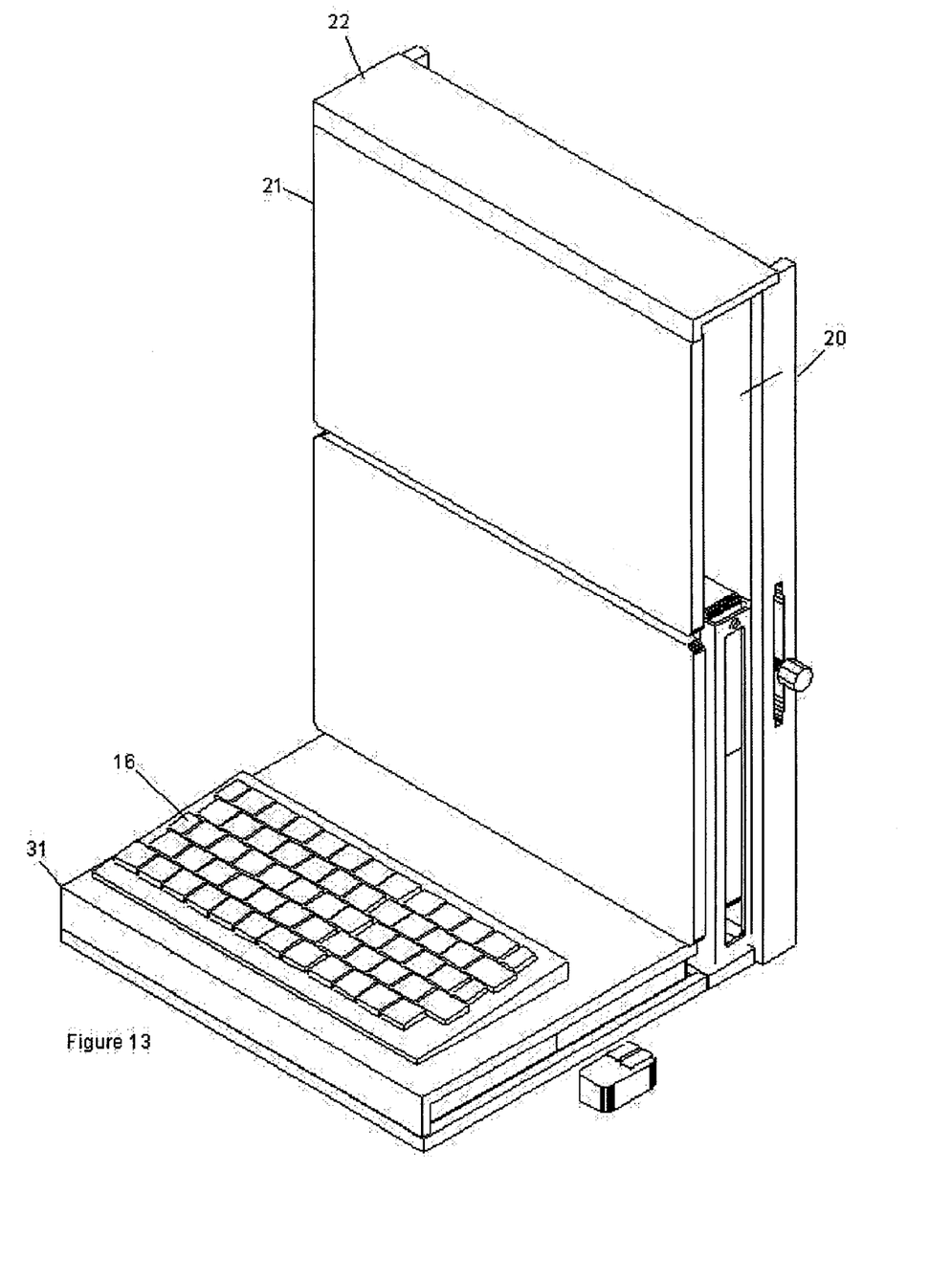
Figure 14:
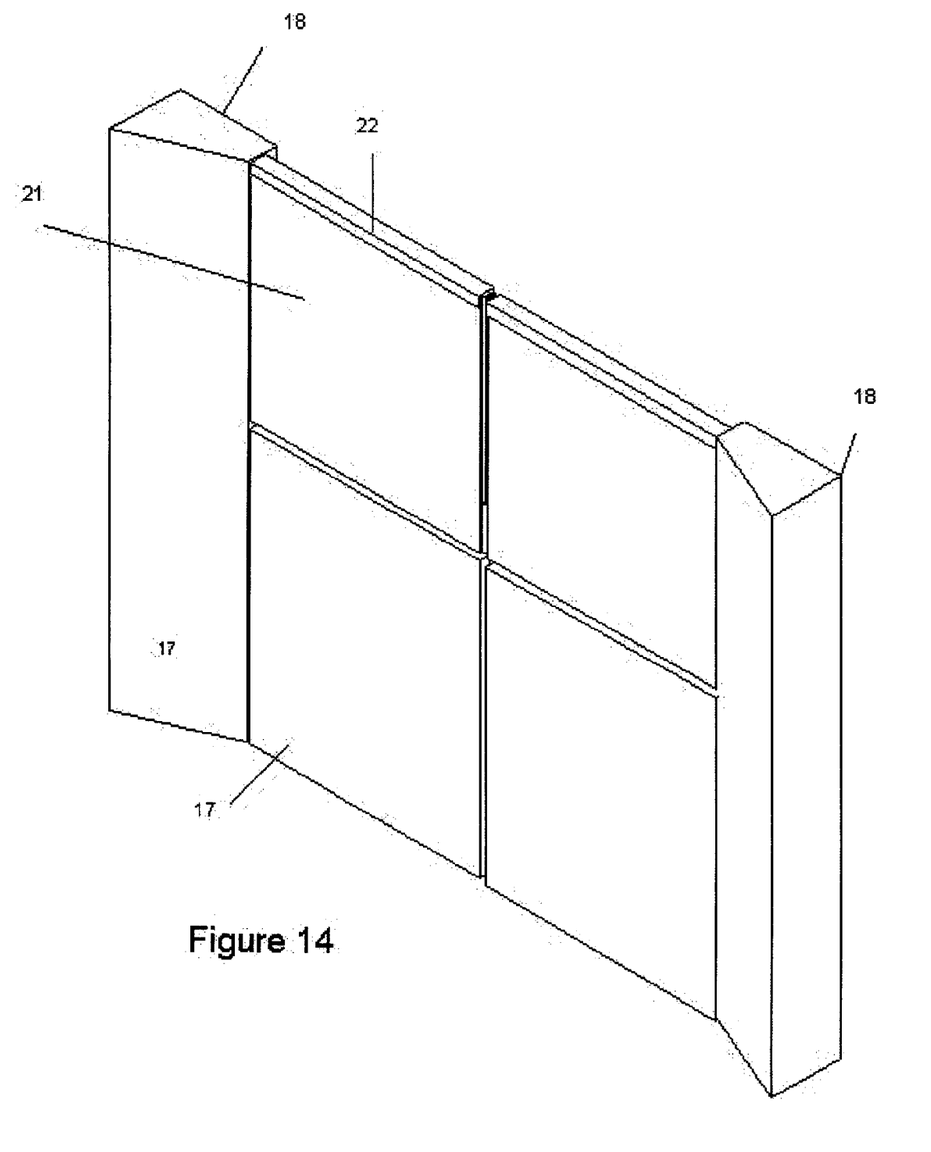
FIG. 14 shows a horizontal arrangement.

Combinations of two laptops to provide the ability to view and operate two portable workstations simultaneously are depicted on FIGS. 12–14. FIG. 12 shows a vertically docked laptop 1 with a horizontally docked laptop 1 just below it. Both computers are fully operational and can be connected to separate networks, i.e. classified, unclassified. The lower laptop cover 31 folds over the lower laptop 1, protecting it and providing storage space to the external keyboard 16.

FIG. 13 shows the same arrangement in closed position.

FIG. 14 shows a horizontal arrangement of the two laptops.

Obviously, numerous modifications and variations of the preferred embodiment described above are possible and will become apparent to those skilled in the art in light of this specification. Moreover, many functions and advantages are described for the preferred embodiment, but in many uses of the invention, not all of these functions and advantages would be needed. Therefore, I contemplate the use of the invention using fewer than the complete set of noted features, process steps, benefits, functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, in all their combinations, are to be considered within the spirit and scope of the invention as defined in the following claims, wherein I claim.

I claim:

1. A laptop docking station mechanism for a laptop computer having a laptop keyboard in a keyboard housing, and a display screen connected by hinges to said keyboard housing, said docking station comprising:

a support frame for holding said laptop keyboard and said display screen of said laptop computer in an upright orientation, such that said display screen is viewable in an ergonomical elevation and angle on a desktop surface, a cover on said frame, said cover being movable on said frame to a position to cover said upright laptop keyboard; and docking connections for electrically connecting an auxiliary keyboard to said laptop computer for use while said laptop computer is in said frame.

2. A laptop docking station mechanism as defined in claim 1, wherein:

said laptop computer is received in said support frame with said display screen above said laptop keyboard, and with docking ports on said laptop computer easily accessible, allowing easy port connectivity to the docking station mechanism.

3. A laptop docking station mechanism as defined in claim 1, further comprising:

a docking system frame including corresponding docking ports that mate with docking ports in said laptop computer when said laptop computer is slid into position.

4. A laptop docking station mechanism as defined in claim 1, further comprising:

a laptop computer holding mechanism in the docking station mechanism that offers users access to a floppy drive and PC Card ports while at the same time offering support needed to hold said laptop in an ergonomically correct elevation and angularity.

5. A laptop docking station mechanism as defined in claim 1, further comprising:

a laptop holding mechanism for holding the laptop in a vertical position during use, and for rotating to allow user access to drive bays for floppies, CD-ROMs, hard drives, or batteries at the front of said laptop computer.

6. A laptop docking station mechanism as defined in claim 1, further comprising:

an integrated full size keyboard that integrates into said docking mechanism and drops down on an axis or is removed entirely for free use on the desktop surface.

7. A laptop docking station mechanism as defined in claim 1, further comprising:

a rotating dock mounting mechanism for connection of standard laptop docking ports to said laptop docking station mechanism.

8. A laptop docking station mechanism as defined in claim 1, further comprising:

a dock slot design that allows said auxiliary keyboard and a mouse to snap into the front of the mount keeping keyboard and mouse clear of the desktop surface.

9. A laptop docking station mechanism for a laptop computer, comprising:

a support frame for holding a laptop computer having a liquid crystal display in such a manner that said liquid crystal display is viewable in an ergonomical elevation and angle on a desktop surface, and docking connections for electrically connecting a keyboard to said laptop computer when said laptop computer is in said frame;

said support frame is sized to hold two laptops docked adjacent to each other to provide the ability to view and operate two portable workstations simultaneously.

10. A laptop docking station mechanism as defined in claim 9, wherein:

said support frame is sized to hold two laptops horizontally docked to provide the ability to view and operate two horizontally adjacent portable workstations simultaneously.

11. A laptop docking station mechanism as defined in claim 9, wherein:

said support frame is sized to hold two laptops vertically docked to provide the ability to view and operate two vertically adjacent portable workstations simultaneously.

12. A laptop docking station mechanism for a laptop computer, comprising:

a support frame for holding a laptop computer having a liquid crystal display in such a manner that said liquid crystal display is viewable in an ergonomical elevation and angle on a desktop surface, and docking connections for electrically connecting a keyboard to said laptop computer when said laptop computer is in said frame;

an anti-reflecting filter made of non reflective glass or plastic and supported on a pivoting bracket to fold over said liquid crystal display;

whereby readability of said display is improved, a clean industrial design is presented, electromagnetic radiation emanating from said portable computer is reduced, and said portable computer is locked to said support frame to lessen chances of theft.

13. A docking station for receiving and holding a portable computer, having an integral keyboard and a display screen, at a convenient, ergonomical orientation for use by a computer user, comprising:

a support frame having a slot mount for receiving and holding said integral keyboard and said display screen of said portable computer in an unfolded and upright position, said slot mount holding said display screen at an individually adjustable ergonomical elevation and angle;

a cover mounted on said support frame in a position to conceal said integral keyboard when said portable computer is supported upright in said slot mount;

electrical sockets at inner portions of said frame for electrically connecting an auxiliary keyboard to said portable computer when said portable computer is inserted into said frame;

openings in said support frame for providing access to functions in said portable computer, such as a floppy disc drive, PC cards and a CD ROM drive.

14. A docking station as defined in claim 13, further comprising:

a docking bar on which said electrical sockets are mounted, movable into engagement with said portable computer;

a vertical docking bracket holding said docking bar in place;

a cross-bar for holding said bracket to said support frame by way of a fastener;

whereby said bar is snapped onto said portable computer to establish electrical connections with said portable computer after placement into said slot mount, and is secured therein by tightening said fastener.

15. A docking station for receiving and holding a portable computer at a convenient, ergonomical orientation for use by a computer user, comprising:

a support frame having an adjustable slot mount for receiving and holding a portable computer having a display screen, said slot mount holding said display screen at an individually adjustable ergonomical elevation and angle;

electrical sockets at inner portions of said frame for electrically connecting a keyboard to said laptop computer when said laptop computer is inserted into said frame;

openings in said support frame for providing access to functions in said portable computer, such as a floppy disc drive, PC cards and a CD ROM drive;

an anti-reflecting filter made of non reflective glass or plastic and supported on a pivoting bracket to fold over said display screen;

whereby readability of said display is improved, a clean industrial design is presented, electromagnetic radiation emanating from said portable computer is reduced, and said portable computer is locked to said support frame to lessen chances of theft.

16. A docking station for a portable laptop computer having a laptop keyboard in a keyboard housing, and a display screen connected by hinges to said keyboard housing, said docking station comprising:

a support frame having a slot for receiving and holding said portable computer with said display screen at an ergonomical elevation and angle for use by a computer user;

electrical sockets in said frame for electrically connecting electrical power inputs, and an auxiliary keyboard to said laptop computer when said laptop computer is inserted into said frame;

an upright cover for covering said laptop keyboard housing and concealing said laptop keyboard while in use in said docking station with said auxiliary keyboard;

openings in said support frame for providing access to functions in said portable computer, such as a floppy disc drive, PC cards and a CD ROM drive.

17. A docking station for a portable laptop computer as defined in claim 16, further comprising:

an adjustment mechanism for adjusting said angle of said support frame to present said display screen at angles to suit individual preferences of individual users.

18. A docking station for a portable laptop computer as defined in claim 16, further comprising:

an electrical socket in said frame for electrically connecting a mouse to said laptop computer when said laptop computer is inserted into said frame.

19. A docking station for a portable laptop computer as defined in claim 16, further comprising:

an integrated full size keyboard that integrates with said docking mechanism for free use on said desktop surface.

20. A docking station for a portable laptop computer as defined in claim 16, wherein:

said frame is a monocoque type of a docking frame supporting said laptop computer in an inclined unfolded position, with a lower part of said laptop computer slid into a slot in said frame and said laptop computer leaning against said frame, with sides of said laptop computer open for any connections.

* * * * *